(12) United States Patent
Ye et al.

(10) Patent No.: US 9,699,072 B2
(45) Date of Patent: Jul. 4, 2017

(54) PACKET HANDLING IN INFORMATION CENTRIC NETWORKING NETWORKS

(71) Applicant: FUJITSU LIMITED, Kawasaki-shi, Kanagawa (JP)

(72) Inventors: Zilong Ye, Sunnyvale, CA (US); Lei Liu, Sunnyvale, CA (US); Akira Ito, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 158 days.

(21) Appl. No.: 14/845,206

(22) Filed: Sep. 3, 2015

(65) Prior Publication Data

US 2017/0070421 A1    Mar. 9, 2017

(51) Int. Cl.
*H04L 12/709* (2013.01)

(52) U.S. Cl.
CPC ................................. *H04L 45/245* (2013.01)

(58) Field of Classification Search
CPC .................................................... H04L 45/245
USPC ........................................................ 370/235
See application file for complete search history.

(56) References Cited

PUBLICATIONS

L. Zhang, et al., "Named Data Networking," ACM Computer Communication Review, vol. 44, No. 3, pp. 66-73, Jul. 2014.
A K M Mahmudul Hogue, et al., "NLSR: Named-data Link State Routing Protocol," Proceedings of the 3rd ACM SIGCOMM Workshop on Information-Centric Networking (ICN 2013), pp. 15-20, Aug. 2013.
D. Kim, et al, "Mobility Support in Content Centric Networks," Proceedings of the 2nd ACM SIGCOMM workshop on Information-Centric Networking (ICN 2012), pp. 13-18, Aug. 2012.

*Primary Examiner* — Stephen J Clawson
(74) *Attorney, Agent, or Firm* — Maschoff Brennan

(57) ABSTRACT

A method of packet handling in an information centric networking (ICN) network is provided. The method may include receiving an interest packet at an incoming interface of a network device. The interest packet may include a pending interest table (PIT) update indicator. After a determination that the PIT update indicator signifies aggregation, the method may include adding the incoming interface to a PIT entry associated with the interest packet. The method may also include determining whether the outgoing interface is in a set of requesting interfaces of the PIT entry. After a determination that the outgoing interface is in the set of requesting interfaces, the method may include removing the outgoing interface from the PIT entry and updating the PIT update indicator based on the PIT entry.

20 Claims, 4 Drawing Sheets

PACKET HANDLING IN INFORMATION CENTRIC NETWORKING NETWORKS

FIELD

The embodiments discussed herein are related to packet handling in information centric networking (ICN) networks.

BACKGROUND

The Internet is currently based on an Internet Protocol (IP) structure, with a frame of reference of where content is located, for example, at a given IP address. In information centric networking (ICN) networks, the frame of reference is based on what content is requested, rather than where the content is located.

The subject matter claimed herein is not limited to embodiments that solve any disadvantages or that operate only in environments such as those described above. Rather, this background is only provided to illustrate one example technology area where some embodiments described herein may be practiced.

SUMMARY

Some embodiments of the present disclosure may include a method of packet handling in an information centric networking (ICN) network. The method may include receiving an interest packet at an incoming interface of a network device, the interest packet including a pending interest table (PIT) update indicator. After a determination that the PIT update indicator signifies aggregation, the method may include adding the incoming interface to a PIT entry associated with the interest packet. The method may also include determining whether the outgoing interface is in a set of requesting interfaces of the PIT entry. After a determination that the outgoing interface is in the set of requesting interfaces, the method may include removing the outgoing interface from the PIT entry. The method may further include updating the PIT update indicator based on the PIT entry.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example embodiments will be described and explained with additional specificity and detail through the use of the accompanying drawings in which.

DESCRIPTION OF EMBODIMENTS

The present disclosure relates to the handling of interest packets and pending interest tables (PIT) in an information centric networking (ICN) network. In ICN networks, an interest packet may request content. In the present disclosure, a packet requesting content may be referred to as an interest packet, and a packet providing content that is requested by an interest packet may be referred to as a content packet.

In some embodiments in in the present disclosure, interest packets may include a PIT update indicator that may signify whether the PIT of a network device receiving the interest packet may aggregate the interest packet in the PIT of the network device (e.g. add the interface on which the interest packet was received to an existing PIT entry or create a new PIT entry), or whether the network device should not update the PIT of the network device based on the incoming interest packet.

In some embodiments, the present disclosure may also include methods to modify PIT entries based on outgoing interest packets. For example, if an outgoing interface for an interest packet is also an interface that received an interest packet requesting the content, that outgoing interface may be removed from a set of interfaces over which requests for the content were received. Alternatively or additionally, if the outgoing interface is the only interface requesting the content, the PIT update indicator may be set to signify disaggregation, or to signify that the PIT of the network device that receives the interest packet (for example, the network device in communication with the outgoing interface) may not be updated based on the interest packet. In some embodiments, the handling of interest packets and associated PIT entries as described in the present disclosure may reduce or remove unnecessary network traffic in the ICN network.

Embodiments of the present disclosure are explained with reference to the accompanying drawings.

Figure 1:
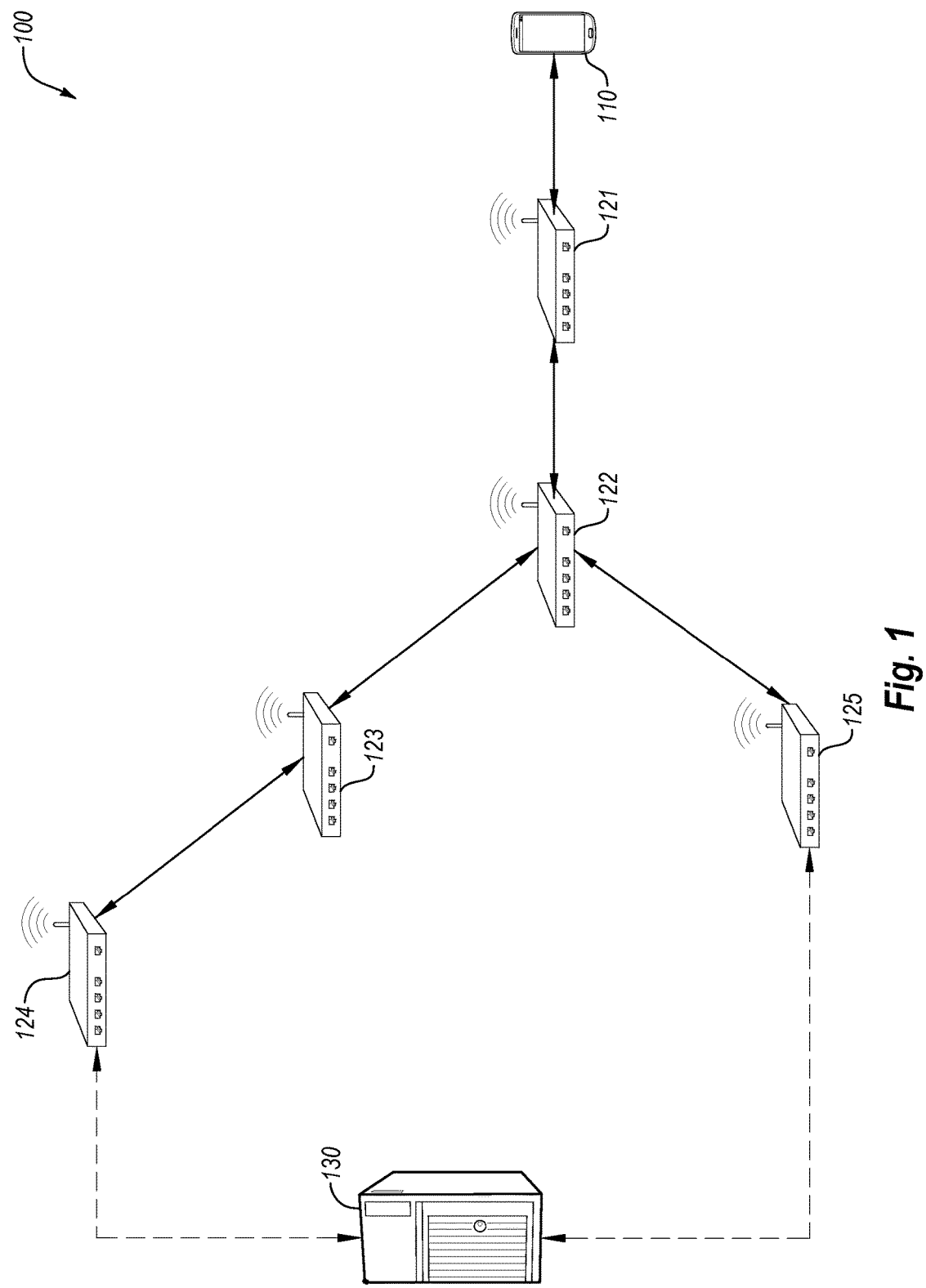
FIG. 1 is a diagram representing an example information centric networking (ICN) network related to handling packets, according to some embodiments of the present disclosure.

FIG. 1 is a diagram representing an example network 100 operating as an ICN network, according to some embodiments described in this disclosure. The network 100 may include an end user 110, one or more network devices 121, 122, 123, 124, and 125, and a content host 130. While the network 100 may have packets, such as interest packets and content packets, routed through the network 100 according to default rules, in some embodiments the network devices 121, 122, 123, 124, and 125 may handle interest packets in a manner that deviates from the default rules.

As illustrated in FIG. 1, the double arrow lines may indicate a connection over which data may be communicated, including general traffic (e.g. interest packets and content packets) for the network 100 and management traffic (e.g. connection status notifications) for the network 100. The dashed lines may indicate a connection which may or may not be formed, or may be formed at one point in time and later weakened, strengthened, or broken, or may not be formed at one point in time and later formed.

The end user 110 may include any device, system, component, or collection of components configured to request content from a remote device. The end user 110 may be implemented as a computer (such as a desktop, laptop, server, etc.), as a mobile device (such as a cellular telephone, personal digital assistant (PDA), tablet, etc.), or as any other device connected to a network (such as a network-enabled thermostat, refrigerator, or other appliance). The end user 110 may include a processor, a memory, and a storage media. By way of example, during operation in the network 100, the end user 110 may send an interest packet to the network device 121. Because the network 100 is operating as an ICN network, the interest packet may not indicate where the desired content is located, but instead may name the content desired by the end user 110.

The network devices 121, 122, 123, 124, and 125 may include any device, system, component, or collection of components configured to receive, handle, and/or process packets within the network 100. The network devices 121, 122, 123, 124, and 125 may each be implemented as a router, a gateway, a switch, or any other network element. In some embodiments, the network devices 121, 122, 123, 124, and 125 may each include a processor, a memory, and a storage media. The network devices 121, 122, 123, 124, and 125 may each also include one or more interfaces over which the network devices 121, 122, 123, 124, and 125 communicate. An interface may include a physical and/or logical entrance or exit point for communication with a network device. For example, the network device 121 may have a first interface that connects the network device 121 to the end user 110 and a second interface that connects the network device 121 to the network device 122.

In some embodiments, the network devices 121, 122, 123, 124, and 125 may each include a content store, a pending interest table (PIT), and a forwarding information base (FIB). The content store, PIT, and FIB may be physical or logical storage components or locations within the memory and/or the storage media of the network devices 121, 122, 123, 124, and 125. An example of an operation/structure/information for each of a content store, a PIT, and a FIB are now explained in general with respect to any network device.

In some embodiments, a content store may operate as a storage location for content which has been requested by another device in the network 100. By implementing one or more network devices in the network 100 with content stores, content that is frequently requested may be located in the content stores of multiple network devices and may be provided to devices requesting the content more quickly and/or efficiently.

In some embodiments, the PIT may serve as a status indicator of what interest packets have been received by a network device for which the network device is still awaiting a content packet. For example, the PIT may have table entries associating requested content with interfaces of the network device that have received interest packets requesting the content. The PIT may be used when a content packet is received by the network device to identify which interfaces have requested that content so the content packet may be sent out from the network device on the interfaces that requested the content, referred to as requesting interfaces.

Figure 3:
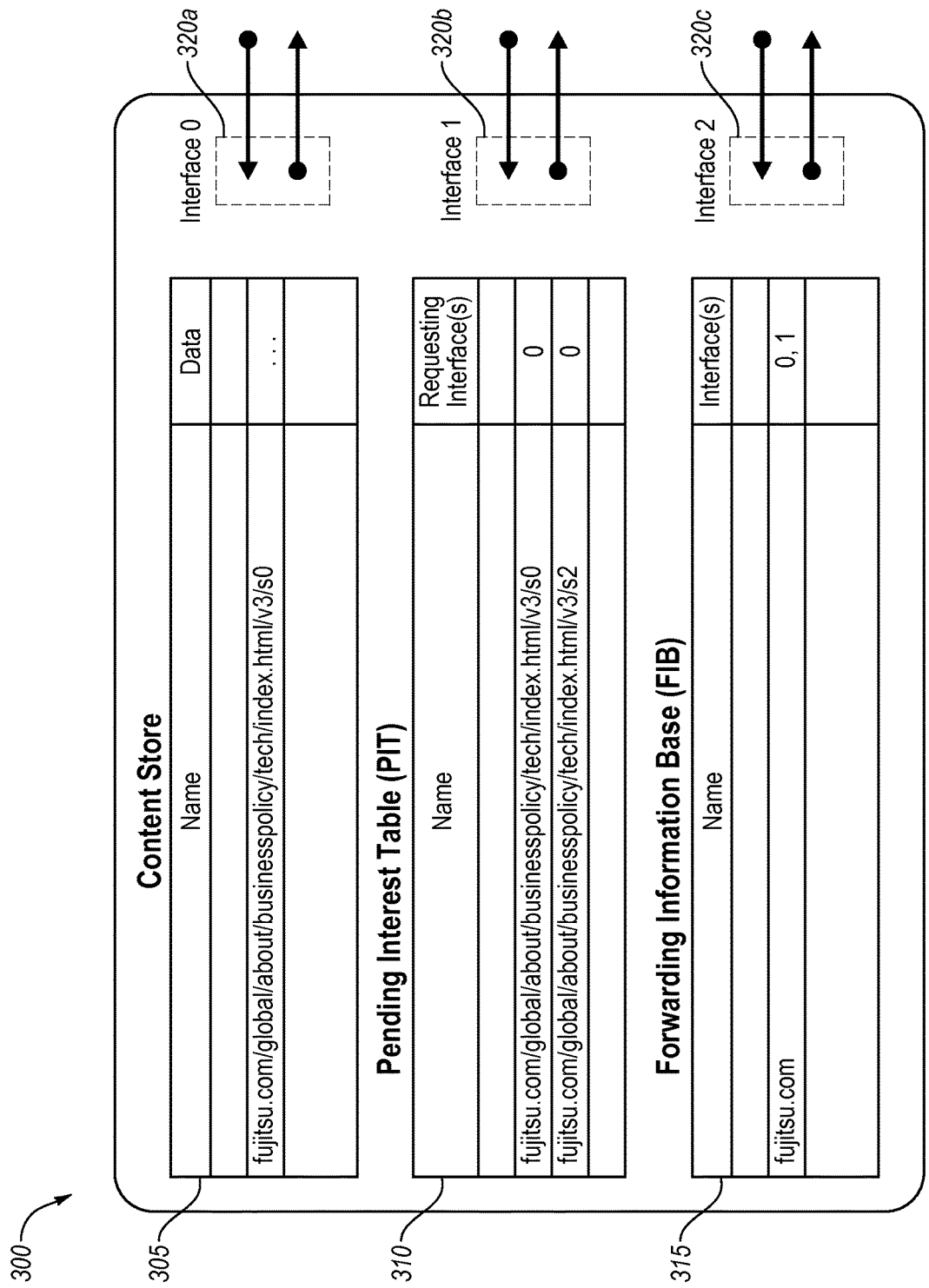
FIG. 3 is an example diagram of various tables within a network device, according to some embodiments of the present disclosure.

In some embodiments, the FIB may be a database, set of rules, protocols, or the like by which a network device may determine where to forward an interest packet when received by the network device. For example, when an interest packet is received at the network device, the FIB may be utilized to determine which interface or interfaces of the network devices are used to transmit the interest packet to request the content. An example of a content store, a PIT, and a FIB is also illustrated in FIG. 3.

By way of example, the operation of the network device 121 is now described when operating under default rules. The network devices 122, 123, 124, and 125 may operate according to the same principles as described with respect to the network device 121.

For example, when the network device 121 receives an interest packet at an incoming interface (for example, from the end user 110 or another network device 122), the network device 121 may check if the interest packet is requesting content already stored in the content store of the network device 121. If the content is in the content store of the network device 121, the network device 121 may send the content in a content packet back over the interface through which the interest packet was received. For example, as shown in FIG. 1, an interest packet may be sent from the end user 110 and received by the network device 121 at an interface. A content packet in response to the received interest packet may be sent to the end user 110 over the same interface that received the interest packet from the end user 110.

If the content is not in the content store of the network device 121, the network device 121 may check the PIT of the network device 121 to determine if there is an entry for the interest packet in the PIT. If there is no entry, the network device 121 may create an entry for the interest packet in the PIT. The entry for the PIT may include the name of the content requested and the interface over which the interest packet was received. If there is an entry in the PIT for the interest packet, the network device 121 may update the entry for the interest packet to also include the interface over which the interest packet was received. For a new entry in the PIT, the network device 121 may forward the interest packet according to rules in the FIB. For example, the rules in the FIB may follow a Named Data Link State Routing (NLSR) protocol or other routing protocols used in ICN networks. Forwarding the interest packet may cause the interest packet to be forwarded over one interface or multiple interfaces. Using ICN default rules, a single interest packet may be forwarded for content, and any additional interest packets requesting the same content may simply update the PIT entry. Also, one interest packet on an interface may result in one content packet being sent over the same interface.

As another example, when the network device 121 receives a content packet, the network device 121 may check the PIT to determine whether the network device 121 has an entry for the content in the content packet. If there is no entry for the content, the network device 121 may discard the content packet. The PIT of the network device 121 may have no entry for the content when the network device 121 has not received an interest packet requesting the content. If there is an entry in the PIT for the content, the network device 121 may store the content in the content store and may transmit a content packet with the content over each of the interfaces in the PIT entry associated with the content. As described above, interest packets may have been received on multiple interfaces requesting the content and thus the content may be associated with multiple interfaces. After the content packet has been sent over the multiple interfaces requesting the content, the network device 121 may remove the entry in the PIT for the content.

The content host 130 may include any device, system, component, or collection of components configured to store and provide content within the network 100. The content host 130 may include a processor, a memory, and a storage media. In some embodiments, the content host 130 may change physical locations such that a connection or a strength of a connection between the content host 130 and one or more of the network devices 121, 122, 123, 124, and 125 may vary. For example, the content host 130 may be initially connected to the network device 124. The content host 130 may change locations such that the connection to the network device 124 is weakened or broken and a connection to the network device 125 may be formed or strengthened. When the content host 130 receives an interest packet for content stored on the content host 130, the content host 130 may send a content packet with the content to the device that sent the interest packet.

The following is an example of operation of the default rules when the content host 130 changes connections. If the end user 110 requested content stored on the content host 130 in the network 100 (and for the sake of the example, not stored on any of the intervening network devices such that the requested content comes from the content host 130), the network device 121 may update the PIT of the network device 121 with the interest packet and may send the interest packet to the network device 122 based on the FIB of the network device 121. The network device 122 may update the PIT of the network device 122 with the interest packet and may send the interest packet to the network device 123 based on the FIB of the network device 122. The network device 123 may update the PIT of the network device 123 with the interest packet and may send the interest packet to the network device 124 based on the FIB of the network device 123. The network device 124 may update the PIT of the network device 124 with the interest packet and may send the interest packet to the content host 130 based on the FIB of the network device 124.

In some embodiments, based on the interest packet, the content host 130 may select the requested content and generate a content packet that includes the requested content. The content host 130 may send the content packet to the network device 124. The network device 124 may store the content of the content packet in the content store of the network device 124, may remove the PIT entry, and may send the content packet to the network device 123. The network device 123 may store the content of the content packet in the content store of the network device 123, may remove the PIT entry, and may send the content packet to the network device 122. The network device 122 may store the content of the content packet in the content store of the network device 122, may remove the PIT entry, and may send the content packet to the network device 121. The network device 121 may store the content of the content packet in the content store of the network device 121, may remove the PIT entry, and may send the content packet to the end user 110. The above-description may describe the operation of the network devices 121, 122, 123, 124, and 125 according to the default rules, generally.

In some embodiments, the content host 130 may have one or more connections made or broken that may affect the handling of interest packets. For example, the content host 130 may be initially connected to the network device 124 and there may be one or more interest packets being routed through the network 100 to the network device 124 to request content from the content host 130. The content host 130 may change locations such that the connection to the network device 124 may be broken and a connection to the network device 125 may be formed. In such a circumstance, the network device 124 may receive a hand-off notification from the content host 130 and the network device 124 may begin caching, buffering, or otherwise storing interest packets received that are requesting content from the content host 130. After the content host 130 is connected to the network device 125, a virtual interest packet may be sent from the network device 125 to the network device 124 to retrieve pending interest packets stored at the network device 124.

After receiving the virtual interest packet requesting the stored interest packets, the network device 124 may send the stored interest packets over the requesting interface. For example, the network device 124 may send the stored interest packets over the interface connected to the network device 123. After receiving the stored interest packets, the network device 123 may update the PIT of the network device 123 to include the interface connected to the network device 124 because that is where the network device 123 received the stored interest packets. The network device 123 may send the stored interest packets to the network device 122. The network device 122 may update the PIT of the network device 122 to include the interface connected to the network device 123 because that is where the network device 122 received the stored interest packets. The network device 122 may send the stored interest packets to the network device 125. The network device 125 may update the PIT of the network device 125 to include the interface connected to the network device 122. The network device 125 may send the stored interest packets to the content host 130.

The content host 130 may send a content packet responsive to the stored interest packets through the requesting interface, e.g. to the network device 125. The network device 125 may store the content in the content store of the network device 125, may remove the PIT entry, and may send the content in a content packet to the network device 122. The network device 122 may have PIT entries for the content to be sent to both the network device 121 (because of the initial user request) and to the network device 123 (because of the stored interest packets). The network device 122 may store the content in the content store of the network device 122, may send the content in content packets to both of the network devices 121 and 123, and may remove the entry from the PIT of the network device 122.

The network device 121 may store the content in the content store of the network device 121, may remove the PIT entry, and may send the content in a content packet to the end user 110. The network device 123 may have entries in the PIT of the network device 123 for the content to be sent to the network device 122 (because of the initial user request) and the network device 124 (because of the stored interest packet). The network device 123 may store the content in the content store of the network device 123, may remove the PIT entry, and may send the content in a content packet to the network devices 122 and 124. The network device 122 may discard the content packet as the network device 122 no longer has a PIT entry for the content. The network device 124 may have a PIT entry for the network device 123 (because of the stored interest packet). The network device 124 may store the content in the content store of the network device 124, may remove the PIT entry, and may send the content in a content packet to the network device 123. The network device 123 may discard the content packet as the network device 123 no longer has a PIT entry for the content.

The above-description may describe the operation of the network devices 121, 122, 123, 124, and 125 according to the default rules when the content host 130 may change connections. Operating according to the default rules in such a circumstance may result in unnecessary and/or wasteful network traffic in the network 100. For example, routing the content packet from the network device 122 to the network device 123 and back to the network device 122 where the content packet is discarded may be unnecessary and/or wasteful. Similarly, routing the content packet from the network device 123 to the network device 124 and back to the network device 123 where the content packet is discarded may be unnecessary and/or wasteful.

In some embodiments, interest packets may be modified or handled in a way to reduce or minimize unnecessary network traffic in an ICN network based on additional information in the interest packets. In these and other embodiments, interest packets may include additional information, such as a PIT update indicator. The PIT update indicator may indicate that an interest packet may be aggregated or disaggregated. Aggregation of an interest packet may include aggregating the interest packet with other interest packets for the content requested by the interest packet in the PIT following default rules as discussed above. For example, a PIT update indicator in an interest packet that indicates aggregation may indicate to a network device that receives the interest packet to update a PIT of the network device according to the default rules by either creating a new PIT entry for the content requested by the interest packet or adding the incoming interface to an already-existing PIT entry. Disaggregation of an interest packet may disaggregate the interest packet from a PIT of a network device. For example, a PIT update indicator in an interest packet that indicates disaggregation may indicate to a network device that receives the interest packet that the interest packet should not be included in any associated PIT entries. Not including the interest packet in any associated PIT entries may include not updated PIT entries based on the interest packet and/or removing any PIT entry associated with the interest packet.

The PIT update indicator may be implemented in any number of a variety of ways of storing information in or as part of a packet. For example, a portion of the interest packet may contain one or more bits signifying aggregation or disaggregation. In some embodiments, a single bit may be used. By way of example, a bit set to "1" may be a default setting and may signify that the interest packet may be aggregated (e.g. the interest packet should cause the PIT entry to update) by a receiving network device. A bit set to "0" may signify disaggregation (e.g. a PIT entry should not be created or updated for the interest packet) by a receiving network device. In some embodiments, the PIT update indicator may signify disaggregation for interest packets sent in response to a virtual interest packet (e.g. when associated with a mobile content host or a content host recovering from a network interruption).

In some embodiments, a network device such as one of network devices 121, 122, 123, 124, or 125 may also include a process to update the PIT update indicator. For example, the network device may check whether an outgoing interface (the interface upon which the interest packet is transmitted out from the network device) is also one of the interfaces requesting the content. The outgoing interface may be a requesting interface, for example, when a virtual interest packet is sent back upstream to retrieve cached interest packets and the cached interest packets traverse the network 100. If the outgoing interface is not one of the requesting interfaces, the interest packet may be handled according to default rules. Handling the interest packet may include setting the PIT update indicator to signify aggregation and/or sending the interest packet according to the FIB of the network device. If the outgoing interface is one of the requesting interfaces, the outgoing interface may be removed from the set of requesting interfaces. If removing the outgoing interface leaves no remaining requesting interfaces, (e.g. if the only reason for the interest packet was for content now being routed through a different path), the PIT update indicator may be set to signify disaggregation and the interest packet may be forwarded according to the FIB. If there are other remaining interfaces on which interest packets were received in the PIT, (e.g. if there are other reasons that the content may be requested from the network device), the PIT update indicator may be set to signify aggregation and the network device may forward the interest packet according to the FIB.

By way of example with reference to FIG. 1, if the content host 130 changes connections from the network device 124 to the network device 125 the network device 125 may send a virtual interest packet to the network device 124. The handling of the interest packets is now described when the network 100 uses PIT update indicators for interest packets.

In these and other embodiments, the network device 125 may send a virtual interest packet to the network device 124 through the network 100 to request any cached interest packets for the content host 130. Before the network device 124 sends the cached interest packet, the network device 124 may check whether the outgoing interface (the interface connecting to the network device 123) is one of the requesting interfaces (i.e. one of the interfaces requesting the content). When the network device 124 determines that the outgoing interface is one of the requesting interfaces (i.e. that the network device 123 is where the interest packet is being sent and is also requesting the content), the network device 124 may remove the outgoing interface from the set of requesting interfaces in the PIT of the network device 124. The network device 124 may check whether there are any other remaining interfaces in the set of requesting interfaces in the PIT of the network device 124. In the example of FIG. 1, there are no other requesting interfaces and so the network device 124 may update the PIT update indicator to signify disaggregation. The network device 124 may send the interest packet with the PIT update indicator signifying disaggregation to the network device 123. The network device 124 may no longer have any entries for the content in the PIT of the network device 124.

When the network device 123 receives the interest packet, the network device 123 may determine whether the PIT update indicator signifies aggregation or disaggregation. The status of the PIT update indicator of the interest packet received at the network device 123 may be based on the PIT of the network device 124. Stated another way, the PIT update indicator of a received interest packet may be based on a status of a PIT of a sending network device. When the network device 123 determines that the PIT update indicator signifies disaggregation, the network device 123 may not add the incoming interface to the set of requesting interfaces. The network device 123 may determine whether the outgoing interface (the interface connecting to the network device 122) is in the set of requesting interfaces. When the network device 123 determines that the outgoing interface is in the set of requesting interfaces (i.e. that the network device 122 is where the interest packet is being sent and is also requesting the content), the network device 123 may remove the outgoing interface from the set of requesting interfaces in the PIT of the network device 123. The network device 123 may determine whether there are any other remaining interfaces in the set of requesting interfaces. In the example of FIG. 1, there are no other requesting interfaces in the PIT of the network device 123 and so the network device 123 may update the PIT update indicator to signify disaggregation. The network device 123 may send the interest packet with the PIT update indicator signifying disaggregation to the network device 122. The network device 123 may no longer have any entries for the content in the PIT of the network device 123.

When the network device 122 receives the interest packet, the network device 122 may determine whether the PIT update indicator signifies aggregation or disaggregation. When the network device 122 determines that the PIT update indicator signifies disaggregation, the network device 122 may not add the incoming interface to the set of requesting interfaces. The network device 122 may determine whether the outgoing interface (the interface connecting to the network device 125) is in the set of requesting interfaces. Because the network device 125 is not in the set of requesting interfaces, the network device may not remove any entries from the PIT. The network device 122 may check whether there are any interfaces in the set of requesting interfaces. Because the interface connecting to the network device 121 is still in the PIT entry for the interest packet (based on the initial request from the end user 110 for the content), the PIT update indicator may be updated to signify aggregation. Stated another way, the PIT update indicator may be updated to indicate that the next network element to receive the interest packet should add the incoming interface to the PIT entry associated with the interest packet. The network device 122 may send the interest packet to the network device 125.

When the network device 125 receives the interest packet, the network device 125 may determine whether the PIT update indicator signifies aggregation or disaggregation. When the network device 125 determines that the PIT update indicator signifies aggregation, the network device 125 may add the incoming interface (the interface connecting to the network device 122) to the PIT entry associated with the interest packet. The network device 125 may forward the interest packet to the content host 130.

In some embodiments, after updating the PIT entry, the network device 125 may determine whether the outgoing interface (the interface connecting to the content host 130) is also a requesting interface. When the network device 125 determines that the outgoing interface is not a requesting interface, the network device 125 may not remove any entries in the PIT. The network device 125 may confirm that the PIT entry still has at least one remaining interface requesting the content, and may update the PIT update indicator to signify aggregation. The network device 125 may send the interest packet on to the content host 130.

The content host 130, upon receipt of the interest packet, may send a responsive content packet containing the requested content to the network device 125. The content packet may be handled according to the default rules, passing from the network device 125, to the network device 122, to the network device 121, and to the end user 110. The content packet may not be routed to the network device 123 or the network device 124 because of the modifications to the PIT entries of the network devices 123 and 124 and by not updating the PIT of the network device 122, as described above.

In some embodiments, the outgoing interface and the incoming interface may be the same physical interface. For example, in some embodiments a network device may have one physical connection to the network 100 that may include multiple logical interfaces. In some embodiments, an interest packet may be received at a network device and, based on the FIB of the network device, may be routed out of the same interface.

While the term "update" or "updating" has been used to describe a network device updating the PIT update indicator, such "updating" may include verifying that a current signification is maintained (e.g. checking that a certain bit value is already set for the PIT update indicator), resetting the PIT update indicator, and setting the PIT update indicator at each network device, or any such method by which the PIT update indicator may be verified by each network device before an interest packet is forwarded. In some embodiments, a network device may not verify or update a PIT update indicator before an interest packet is forwarded to a content host.

While the example has been used of a hand-off of the content host 130 between the network device 124 and the network device 125 (for example, the content host 130 changing locations and thus breaking or weakening the connection with the network device 124 and forming or strengthening the connection to the network device 125), other scenarios may also benefit from at least some of the principles of the present disclosure. For example, if the connection between the content host 130 and the network device 124 was a primary network connection, and the connection between the content host 130 and the network device 125 was a backup or redundant connection, when there is a physical failure (for example due to a natural disaster, a line breaking, hardware failure, etc.) or a logical failure (for example due to a malware attack, a processing glitch, a software update, etc.) such that the content host 130 may transition to using the network device 125 as a primary connection to the network 100, the same principles described in the present disclosure may also provide the benefit of preventing unnecessary network traffic to the network devices 122, 123, and/or 124.

The process by which the PIT update indicator is updated and how PIT entries may be handled within a network device in accordance with some embodiments of the present disclosure may also be described with reference to FIG. 4.

Modifications, additions, or omissions may be made to FIG. 1 without departing from the scope of the present disclosure. For example, the network 100 may include more or fewer elements than those illustrated and described in the present disclosure. For example, the network 100 may include many more network devices, content hosts, and end users arranged in any topology. The small number of network nodes and simple topology illustrated are for ease in understanding the present disclosure.

Figure 2:
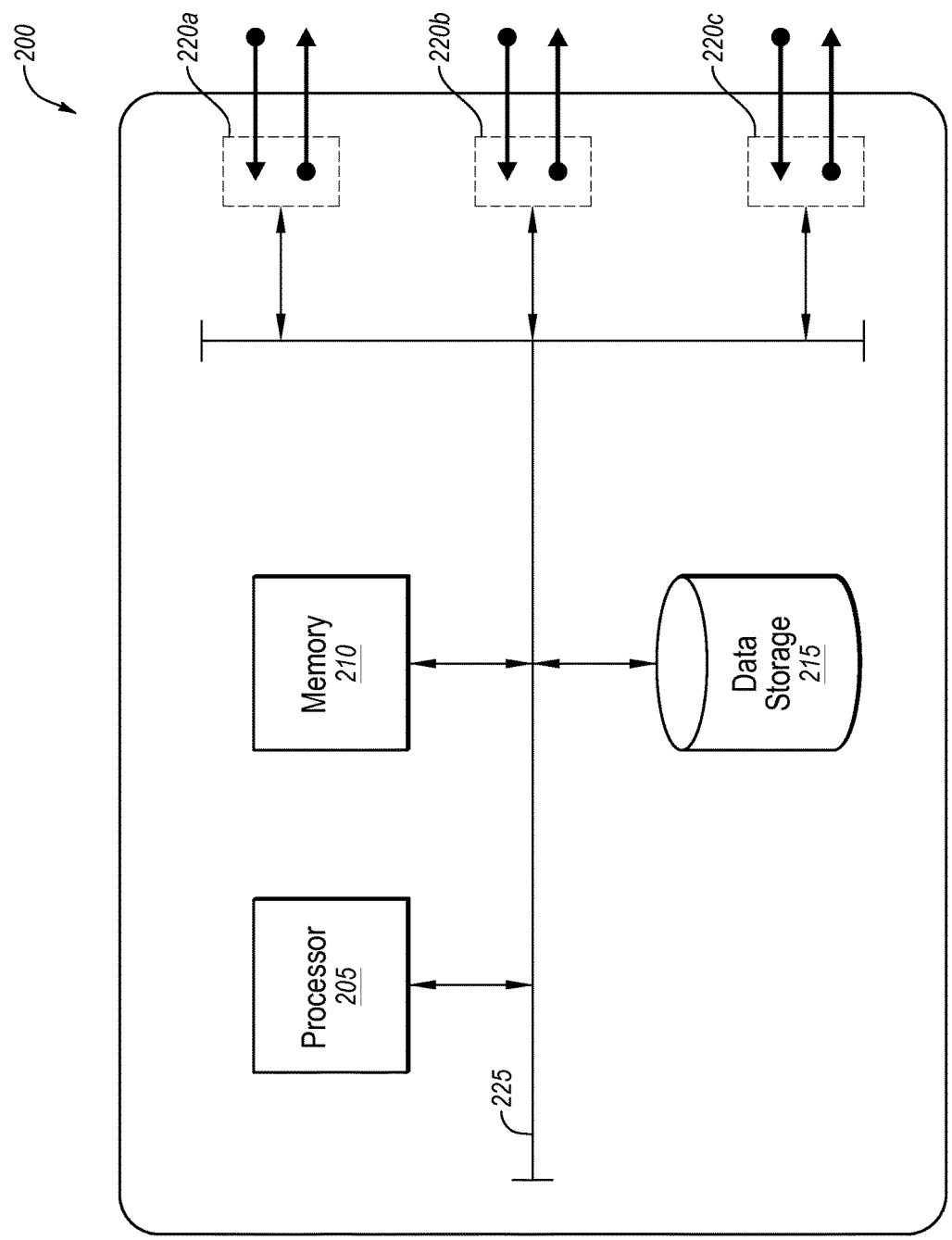
FIG. 2 illustrates an example network device operating in an ICN network, according to some embodiments of the present disclosure.

FIG. 2 illustrates a block diagram of an example network device 200, according to some embodiments of the present disclosure. Any one of the network devices 121, 122, 123, 124, or 125 may be implemented as a computing system such as the example network device 200. The network device 200 may be configured to implement one or more operations of the present disclosure. The network device 200 may include a processor 205, a memory 210, a data storage 215, a bus 225, and one or more interfaces 220*a*, 220*b*, and 220*c*. The processor 205, the memory 210, the data storage 215, and the interfaces 220*a*, 220*b*, and 220*c* may be communicatively coupled, for example, via the bus 225.

In general, the processor 205 may include any suitable special-purpose or general-purpose computer, computing entity, or processing device including various computer hardware or software modules and may be configured to execute instructions stored on any applicable computer-readable storage media. For example, the processor 205 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 205 may include any number of processors configured to perform, individually or collectively, any number of operations described in the present disclosure.

In some embodiments, the processor 205 may interpret and/or execute program instructions and/or process data stored in the memory 210, the data storage 215, or the memory 210 and the data storage 215. In some embodiments, the processor 205 may fetch program instructions from the data storage 215 and load the program instructions in the memory 210. After the program instructions are loaded into memory 210, the processor 205 may execute the program instructions.

The memory 210 and the data storage 215 may include computer-readable storage media for carrying or having computer-executable instructions or data structures stored thereon. Such computer-readable storage media may include any available media that may be accessed by a general-purpose or special-purpose computer, such as the processor 205. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 205 to perform a certain operation or group of operations.

The bus 225 may include any device, system, component, or collection of components configured to allow or facilitate communication between one or more of the components of the network device 200. For example, the bus 225 may allow communication between the processor 205, the memory 210, the storage device 215 and the one or more interfaces 220a, 220b, and 220c. The bus 225 may include, without limitation, a plurality of parallel wires, a single wire connection between components, a series of slots or ports with electrical connections between them, printed circuits on a circuit board, a daisy-chain connecting components, etc. The bus 225 may be implemented as a plurality of buses, such as any combination of a control bus, an address bus, a data bus, a system bus, a front-side bus, an internal bus, an external bus, an expansion bus, a peripheral bus, a device bus, a parallel bus, a Peripheral Component Interconnect (PCI) bus, a PCI Express (PCIe) bus, a Small Computer System Interface (SCSI) bus, an Integrated Drive Electronics (IDE) bus, a Serial Advanced Technology Attachment (SATA) bus, an External SATA (eSATA) bus, a FireWire bus, a Universal Serial Bus (USB), etc. The bus 225 may include a controller for directing, regulating, or otherwise controlling flow of data across the bus 225. Such a controller may regulate for artifacts such as cross-talk, timing skew, etc. which may occur on the bus 225.

The interfaces 220a, 220b, and 220c may include any device, system, component, or collection of components configured to allow or facilitate communication between network components in an ICN network. For example, the interfaces 220a, 220b, and 220c may include, without limitation, a modem, a network card (wireless or wired), an infrared communication device, an optical communication device, a wireless communication device (such as an antenna), and/or chipset (such as a Bluetooth device, an 802.6 device (e.g. Metropolitan Area Network (MAN)), a WiFi device, a WiMax device, cellular communication facilities, etc.), and/or the like. The interfaces 220a, 220b, and 220c may permit data to be exchanged with a network (such as a cellular network, a WiFi network, a MAN, an optical network, etc., to name a few examples) and/or any other devices described in the present disclosure, including remote devices. In some embodiments, the interfaces 220a, 220b, and 220c may be logical distinctions on a single physical component, for example, multiple communication streams across a single physical cable or optical signal.

Modifications, additions, or omissions may be made to the network device 200 without departing from the scope of the present disclosure. For example, in some embodiments, the network device 200 may include any number of other components that may not be explicitly illustrated or described.

FIG. 3 is an example diagram of various tables within a network device 300, according to some embodiments of the present disclosure. The network device 300 may be the same or similar to the network devices 121, 122, 123, 124, and 125 of FIG. 1 or the network device 200 of FIG. 2. The network device 300 may include a content store 305, a PIT 310, a FIB 315, and interfaces 320a (Interface 0), 320b (Interface 1), and 320c (Interface 2). In some embodiments, each of the content store 305, the PIT 310, the FIB 315, and the interfaces 320a, 320b, and 320c may be implemented as described with respect to FIG. 1.

For example, when an interest packet is received at the network device 300 at the interface 320a, the network device 300 may determine if the content requested in the interest packet is stored in the content store 305. If the content is in the content store 305, the network device 300 may send the content in a content packet back through the interface 320a. If the content is not stored in the content store 305, the network device 300 may update the PIT 310 to include the interest packet. Updating the PIT 310 may include generating a new entry in the PIT 310 associated with the interface 320a if no entry exists for the content or adding the interface 320a to the PIT entry already requesting the content. When sending an interest packet, the network device 300 may forward the interest packet according to the FIB 315, which, for example, may operate according to the NLSR protocol.

As described above, in some embodiments the PIT 310 may be modified based on the PIT update indicator of an incoming interest packet. For example, if an interest packet is received over the interface 320a and the PIT update indicator signified disaggregation, the PIT 310 may not be changed even though there was an incoming interest packet. As another example, the network device 300 may determine if the outgoing interface for the interest packet is one of the requesting interfaces. For example, if the interest packet associated with the entry for fujitsu.com/global/about/businesspolicy/tech/index.html/v3/s0 was going out on the interface 320a, the PIT 310 may be updated to remove that interface from the set of requesting interfaces. Such modification of the PIT 310 may remove an entry from the PIT 310, for example, if there are no remaining requesting interfaces for the entry.

Modifications, additions, or omissions may be made to the network device 300 without departing from the scope of the present disclosure. For example, in some embodiments, the network device 300 may include any number of other components that may not be explicitly illustrated or described.

Figure 4:
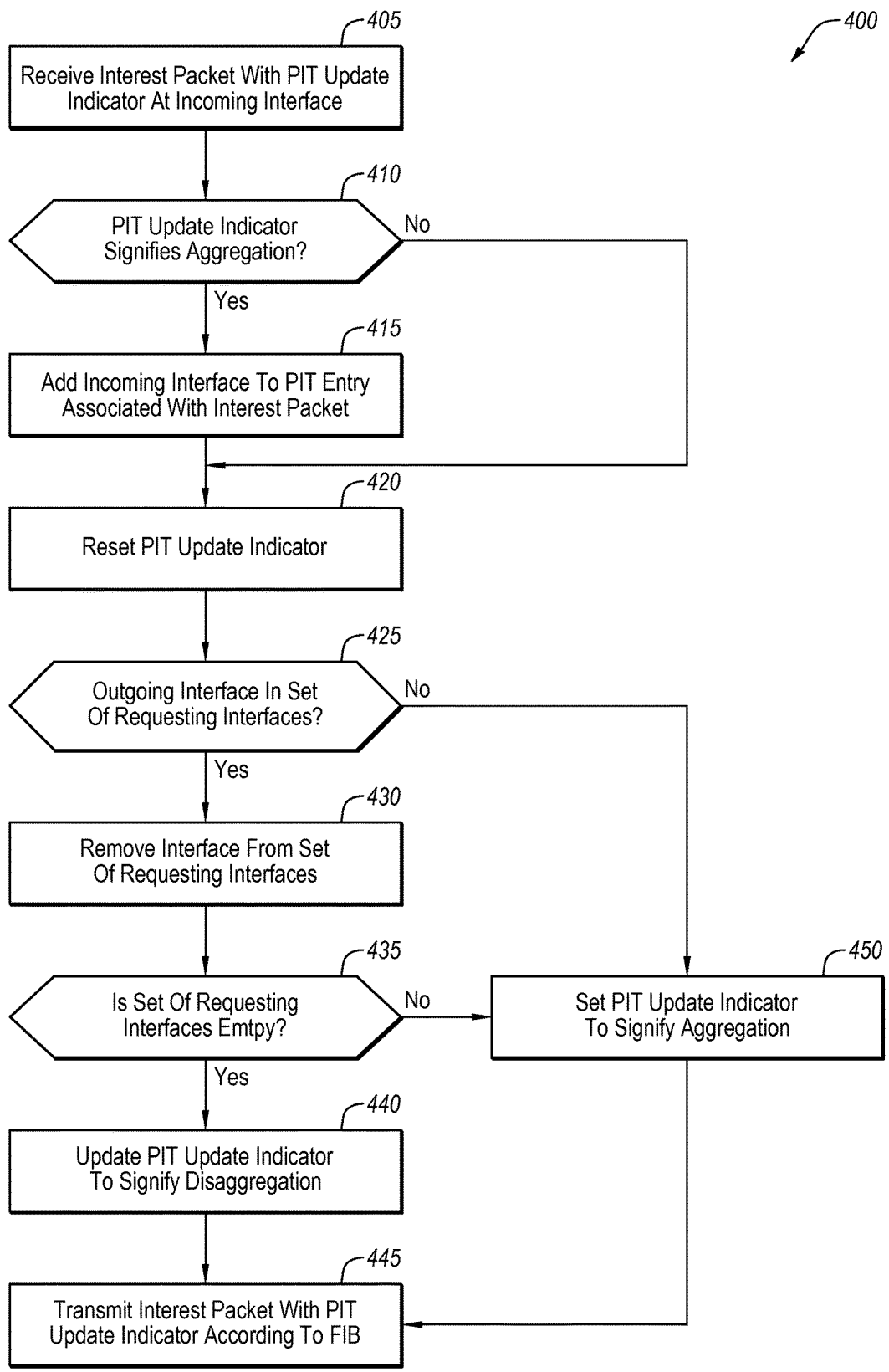
FIG. 4 is a flowchart of an example method of handling packets in an ICN network, according to some embodiments of the present disclosure.

FIG. 4 is a flowchart of an example method 400 of packet handling in an ICN network, according to some embodiments of the present disclosure. The method 400 may be performed by any suitable system, apparatus, or device. For example, the network 100 of FIG. 1, the network device 200 of FIG. 2, or the network device 300 of FIG. 3 may perform one or more of the operations associated with the method 400. In these and other embodiments, program instructions stored on a computer readable medium may be executed to perform one or more of the operations of the method 400.

At block 405, an interest packet may be received that includes a PIT update indicator. The interest packet may be received at an incoming interface of a network device. At block 410, the network device may determine whether the PIT update indicator signifies aggregation or disaggregation. For example, the network device may check a bit or set of bits designated as the PIT update indicator in the incoming interest packet. In some embodiments, such a bit may be set to a "1" to signify aggregation and set to a "0" to signify disaggregation. After a determination that the PIT update indicator signifies aggregation, the method 400 may proceed to block 415. After a determination that the PIT update indicator signifies disaggregation, the method 400 may proceed to block 420.

At block 415, the network device may modify the PIT of the network device to add the incoming interface to a PIT entry associated with the received interest packet. As described above, modifying the PIT may include creating a new entry for the interest packet or updating an existing entry with the incoming interface. Modifying the PIT based on the incoming interest packet may be done in conformity with the default rules as described above. At block 420, the network device may reset the PIT update indicator.

At block 425, the network device may determine whether the outgoing interface is in the set of interfaces requesting the content in the PIT entry. Stated another way, an inquiry is made as to whether the location to which the interest packet is being sent is a location requesting that same content. If it is determined that the outgoing interface is in the set of requesting interfaces, the method 400 may proceed to block 430. If it is determined that the outgoing interface is not in the set of requesting interfaces, the method 400 may proceed to block 450.

At block 430, after it has been determined that the outgoing interface is in the set of requesting interfaces, the network device may update the PIT entry to remove the outgoing interface from the set of requesting interfaces. At block 435, the network device may determine whether removing the interface from the set of requesting interfaces renders the set of requesting interfaces empty. If it is determined that the set of requesting interfaces is empty as a result of the operation at the block 430, the method 400 may proceed to block 440. If it is determined that the set of requesting interfaces is not empty as a result of the operation at the block 430, the method 400 may proceed to block 450.

At block 440, the network device may update the PIT update indicator to signify disaggregation. As described above, updating the PIT update indicator may include setting one or more bits in the outgoing interest packet to a particular value, such as a zero. Setting the PIT update indicator value to signify disaggregation may allow the network device to indicate to a next network device in the path of the interest packet not to send the content packet back to the network device performing the method 400. At block 445, the network device may transmit the interest packet with the PIT update indicator according to the FIB of the network device.

As described above, the method 400 may proceed to block 450 after it is determined at block 425 that the outgoing interface is not in the set of requesting interfaces. The method 400 may also proceed to block 450 after it is determined that the set of requesting interfaces is not empty at block 435. At block 450, the network device may set the PIT update indicator to signify aggregation. Setting the PIT update indicator to signify aggregation may include setting one or more bits in the outgoing interest packet to a particular value, such as setting a reserved bit to a one. Setting the PIT update indicator to signify aggregation may allow the network device performing the method 400 to indicate to the next network device in the path of the interest packet that the network device performing the method 400 requests the content packet associated with the interest packet to be sent to the network device performing the method 400. After the PIT update indicator has been set at block 450, the method 400 may proceed to block 445 where the interest packet with the PIT update indicator is transmitted.

Modifications, additions, or omissions may be made to the method 400 without departing from the scope of the present disclosure. For example, the operations of the method 400 may be implemented in differing order. Additionally or alternatively, two or more operations may be performed at the same time. For example, blocks 415 and 420 may be done simultaneously. Furthermore, the outlined operations and actions are only provided as examples, and some of the operations and actions may be optional, combined into fewer operations and actions, or expanded into additional operations and actions without detracting from the essence of the disclosed embodiments. For example, block 450 may be removed if the operation at block 420 resets the PIT update indicator to signify aggregation by default. As another example, block 420 may be removed.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases at least one and one or more to introduce claim recitations. However, the use of such phrases should not be construed to imply that the introduction of a claim recitation by the indefinite articles "a" or an limits any particular claim containing such introduced claim recitation to embodiments containing only one such recitation, even when the same claim includes the introductory phrases one or more or at least one and indefinite articles such as "a" or an (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of packet handling in an information centric networking (ICN) network, the method comprising:
    receiving an interest packet at an incoming interface of a network device, the interest packet including a pending interest table (PIT) update indicator;
    after a determination that the PIT update indicator signifies aggregation, adding the incoming interface to a PIT entry associated with the interest packet;
    determining whether an outgoing interface is in a set of requesting interfaces of the PIT entry;
    after a determination that the outgoing interface is in the set of requesting interfaces, removing the outgoing interface from the PIT entry; and
    updating the PIT update indicator based on the PIT entry.

2. The method of claim 1, wherein updating the PIT update indicator comprises:
    determining whether the PIT entry is empty; and
    after a determination that the PIT entry is empty, setting the PIT update indicator to signify disaggregation.

3. The method of claim 1, wherein updating the PIT update indicator comprises:
    determining whether the PIT entry is empty; and
    after a determination that the PIT entry is not empty, setting the PIT update indicator to signify aggregation.

4. The method of claim 1, wherein the PIT update indicator comprises a single bit in the interest packet.

5. The method of claim 1, wherein the PIT update indicator of the interest packet is based on a PIT of a sending network device.

6. The method of claim 1, wherein the interest packet is a virtual interest packet based on a content host changing one or more connections to one or more network devices.

7. The method of claim 6, wherein the content host changes connections based on one or more of the content host changing physical locations or a network interruption in the ICN network.

8. A non-transitory computer-readable medium containing instructions that, when executed by a processor, are configured to cause the processor to perform operations, the operations comprising:
    receiving an interest packet at an incoming interface of a network device, the interest packet including a pending interest table (PIT) update indicator;
    after a determination that the PIT update indicator signifies aggregation, adding the incoming interface to a PIT entry associated with the interest packet;
    determining whether an outgoing interface is in a set of requesting interfaces of the PIT entry;
    after a determination that the outgoing interface is in the set of requesting interfaces, removing the outgoing interface from the PIT entry; and
    updating the PIT update indicator based on the PIT entry.

9. The computer-readable medium of claim 8, wherein updating the PIT update indicator includes further operations comprising:
    determining whether the PIT entry is empty; and
    after a determination that the PIT entry is empty, setting the PIT update indicator to signify disaggregation.

10. The computer-readable medium of claim 8, wherein updating the PIT update indicator includes further operations comprising:
    determining whether the PIT entry is empty; and
    after a determination that the PIT entry is not empty, setting the PIT update indicator to signify aggregation.

11. The computer-readable medium of claim 8, wherein the PIT update indicator comprises a single bit in the interest packet.

12. The computer-readable medium of claim 8, wherein the PIT update indicator of the interest packet is based on a PIT of a sending network device.

13. The computer-readable medium of claim 8, wherein the interest packet is a virtual interest packet based on a content host changing one or more connections to one or more network devices.

14. A network device for operating in an information centric networking (ICN) network, the network device comprising:
    an incoming interface;
    an outgoing interface;
    one or more processors; and
    a memory storing computer-readable instructions that, when executed by the processor, are configured to cause the processor to perform operations, the operations comprising:
        receiving an interest packet at the incoming interface, the interest packet including a pending interest table (PIT) update indicator;
        after a determination that the PIT update indicator signifies aggregation, adding the incoming interface to a PIT entry associated with the interest packet;
        determining whether the outgoing interface is in a set of requesting interfaces of the PIT entry;
        after a determination that the outgoing interface is in the set of requesting interfaces, removing the outgoing interface from the PIT entry; and
        updating the PIT update indicator based on the PIT entry.

15. The network device of claim 14, wherein updating the PIT update indicator includes further operations comprising:

determining whether the PIT entry is empty; and
after a determination that the PIT entry is empty, setting the PIT update indicator to signify disaggregation.

16. The network device of claim 14, wherein the updating the PIT update indicator includes further operations comprising:
determining whether the PIT entry is empty; and
after a determination that the PIT entry is not empty, setting the PIT update indicator to signify aggregation.

17. The network device of claim 14, wherein the PIT update indicator comprises a single bit in the interest packet.

18. The network device of claim 14, wherein the PIT update indicator of the interest packet is based on a PIT of a sending network device.

19. The network device of claim 14, wherein the interest packet is a virtual interest packet based on a content host changing one or more connections to one or more network devices.

20. The network device of claim 19, wherein the incoming interface and the outgoing interface are the same interface.

* * * * *